United States Patent [19]

Shimizu et al.

[11] Patent Number: 5,516,547
[45] Date of Patent: May 14, 1996

[54] METHOD FOR FABRICATING MAGNETIC RECORDING MEDIUM

[75] Inventors: Teruhisa Shimizu, Yokohama; Shinji Takayama, Mitaka, both of Japan

[73] Assignee: International Business Machines COrporation, Armonk, N.Y.

[21] Appl. No.: 456,971

[22] Filed: Jun. 1, 1995

Related U.S. Application Data

[62] Division of Ser. No. 268,872, Jun. 30, 1994, which is a continuation of Ser. No. 940,160, Sep. 3, 1992, abandoned.

[30] Foreign Application Priority Data

Sep. 6, 1991 [JP] Japan ...................... 3-254179

[51] Int. Cl.$^6$ ...................................... B05D 5/12
[52] U.S. Cl. ................ 427/132; 204/192.2; 204/192.23; 427/128; 427/250; 427/255.3; 427/294
[58] Field of Search ..................... 427/128–132, 427/250, 255.3, 294; 204/192.2, 192.23

[56] References Cited

U.S. PATENT DOCUMENTS

| | | | |
|---|---|---|---|
| 4,752,344 | 6/1988 | Jubb et al. | 148/310 |
| 4,766,034 | 8/1988 | Sato et al. | 428/336 |
| 4,789,598 | 12/1988 | Howard et al. | 428/408 |
| 5,062,938 | 11/1991 | Howard | 204/192.2 |
| 5,143,794 | 9/1992 | Suzuki et al. | 428/611 |
| 5,158,933 | 10/1992 | Holtz et al. | 305/1 |
| 5,298,282 | 3/1994 | Sugita et al. | 427/132 X |
| 5,326,637 | 7/1994 | Nasu et al. | 427/132 X |
| 5,378,496 | 1/1995 | Kashiwaya | 427/132 X |

FOREIGN PATENT DOCUMENTS

| | | |
|---|---|---|
| 56-7231 | 1/1981 | Japan . |
| 56-29 | 1/1981 | Japan . |
| 62-60119 | 3/1987 | Japan . |
| 62-162223 | 7/1987 | Japan . |
| 1232517 | 9/1989 | Japan . |
| 1232516 | 9/1989 | Japan . |

OTHER PUBLICATIONS

Journal of Magnetics Society of Japan, vol. 13, No. 3, "Micro–Structure and Magnetic–Pro Sputtered Co–Alloy/Cr Rigid Disk Media", by A. Terada (No date avail).
Liou et al., "Granular Metal Films as Recording Media", Appl. Phys. Letter, vol. 52, No. 6, pp. 512–514, Feb. 1988.
Edelstein et al., "Phase Separated Fe and Co Particle in a BN Matrix", J. Appl. Phys. 61 (8), pp. 3320–3322, Apr. 1987.

*Primary Examiner*—Bernard Pianalto
*Attorney, Agent, or Firm*—Matthew J. Bussan

[57] ABSTRACT

The invention is intended to provide a magnetic recording medium suitable for longitudinal recording, which has low medium noise and high coercivity. A magnetic recording medium includes a substrate 1 and a magnetic layer 2 formed on the substrate 1. The magnetic layer 2 consists of a mixture of a magnetic alloy and a non-magnetic compound. The magnetic alloy is Co-based, Fe-based, or CoFe-based, and the non-magnetic compound is selected from a group consisting of oxides and nitrides. The volume percentage of the non-magnetic compound in the entire volume of the mixed magnetic alloy and non-magnetic compound is preferably not less than about 2% and not more than about 30%.

11 Claims, 4 Drawing Sheets

METHOD FOR FABRICATING MAGNETIC RECORDING MEDIUM

This is a divisional of co-pending application Ser. No. 08/268,872, filed on Jun. 30, 1994, which is a continuation of application Ser. No. 07/940,160 filed on Sep. 3, 1992, abandoned.

BACKGROUND OF THE INVENTION

1. Field of the Invention

This invention relates to a magnetic recording medium for use in a magnetic recording apparatus or the like, and to a method for fabricating it.

2. Description of the Prior Art

Metal film media called continuous media using a ferromagnetic material such as a Co-based magnetic alloy have recently been used as magnetic recording media. However, such magnetic materials as are currently used, if formed into a thin film, do not inherently possess strong in-plane magnetic anisotropy suitable for longitudinal recording. Therefore, a non-magnetic underlayer is provided on a non-magnetic substrate, and a magnetic layer is provided on the underlayer, so as to obtain in-plane magnetic anisotropy. In these magnetic media, however, the characteristics of the magnetic layer vary with the film configuration and the status of non-magnetic underlayer. Therefore, the magnetic layer must be fabricated as carefully as the underlayer, which complicates the control of the process for fabricating the underlayer film.

On the other hand, it is known that exchange coupling between magnetized fine grains increases the magnetization transitional width and causes medium noise. In order to increase the recording density, it is important to suppress medium noise. JA PUPA 1-232516 and JA PUPA 1-23517 disclose techniques for reducing medium noise wherein a new alloy of quaternary or higher degree is prepared by adding an element or elements (C, P, Bi, and so forth) to a Co-based magnetic ternary alloy, and a film of the obtained alloy is fabricated on a substrate. However, because coupling between magnetic alloy grains remains in the magnetic layer, medium noise is not suppressed sufficiently. Further, the coercivity obtained may be less than 1000 (Oe). In addition, a Cr underlayer is still required.

SUMMARY OF THE INVENTION

The invention provides a magnetic recording medium suitable for longitudinal recording, which has low medium noise and high coercivity. It also provides a recording medium suitable for longitudinal recording. This medium has a simple structure because an underlayer is not necessary and the manufacturing process is consequently simplified.

PROBLEM TO BE SOLVED BY THE INVENTION

Therefore, an object of the invention is to provide a magnetic recording medium suitable for longitudinal recording, with low medium noise and high coercivity.

Another object of the invention is to provide a magnetic recording medium using a Co-based, Fe-based, or FeCo-based magnetic alloy for its magnetic layer and having magnetic characteristics suitable for longitudinal magnetic recording, without using an underlayer.

A magnetic recording medium according to the invention includes a substrate and a magnetic layer. Its characteristics are that the magnetic layer consists of a mixture of a magnetic material and a non-magnetic compound, the magnetic material being Co-based, Fe-based, or FeCo-based and the non-magnetic compound being selected from a group consisting of oxides and nitrides.

Examples of Co-based magnetic materials are CoNiCr, CoNiPt, CoCrPt, and CoCrTa. Examples of non-magnetic compounds are silicon oxide, zirconium oxide, tantalum oxide, silicon nitride, boron nitride, titanium nitride, and aluminum nitride. Non-magnetic compounds should have a suitable hardness under a room temperature and must be fit for thin-film processings; for example, sputtering, vapor-deposition, or beam evaporation.

The magnetic anisotropy of a single film composed of magnetic alloys as shown above does not preferentially grow in the in-plane direction. Therefore, a non-magnetic underlayer has hitherto been provided in order to obtain in-plane anisotropy of the magnetic layer. In the invention, however, a non-magnetic compound and a magnetic material are deposited simultaneously into a magnetic layer so that the non-magnetic compound, which is not fused into the magnetic material, exists in the magnetic layer, and thereby inclines the magnetic anisotropy direction of the magnetic layer in a direction parallel to the medium surface without an underlayer. This inclination is assumed to be caused by a non-magnetic compound changing the crystal growth orientation of the magnetic alloy and inducing an anisotropy suitable for in-plane magnetic recording. It is also noted that a non-magnetic compound causes high coercivity and reduces medium noise because it isolates and makes magnetic alloy grains finer.

Overall estimation of the magnetic characteristics, read/write characteristics, and reliability indicates that a suitable composition for the above Co-based magnetic alloy can be expressed by the following general formulas:

$$Co(1-x-y)Ni(x)Cr(y)$$

where x=0.2 to 0. 4 and y=0.05 to 0. 1

$$Co(1-x-y)Ni(x)Pt(y)$$

where x=0.2 to 0.4 and y=0.01 to 0.2

$$Co(1-x-y)Cr(x)Pt(y)$$

where x=0. 1 to 0.3 and y=0.01 to 0.2

$$Co(1-x-y)Cr(x)Ta(y)$$

where x=0.1 to 0.3 and y=0.01 to 0.05

(see A. Terada: Journal of the Magnetics Society of Japan Vol. 13, No. 3, 493(1989))

The volume percentage of non-magnetic compound in the entire volume of mixed magnetic alloy and non-magnetic compound (hereafter called the mixed volume percentage) is preferably not less than about 2% and not more than about 30%. The maximum effect is obtained at about 5%.

Even if the Co-based alloy is binary (for example, CoNi, CoPd, CoCr, and CoPt), quaternary (for example, CoNiCrV and CoNiCrCu), or of higher degree, the coupling status among grains in the Co-based alloy film is substantially the same as in the ternary alloy. Therefore, the same effects are expected to be caused by mixing a non-magnetic compound with these alloys. For the same reason, substantially the same effects are expected even when the magnetic material to be mixed with the non-magnetic compound is replaced by an Fe-based alloy (for example, γ-Fe2O3), an Fe-based alloy (for example, FeNi), or an FeCo-based alloy (for example, FeCoCr).

Either evaporation or sputtering may be used as a method of fabricating both films at the same time, since it is satisfactory for the invention to realize a mixture of a magnetic alloy and a non-magnetic compound in a magnetic film.

DETAILED DESCRIPTION OF THE PREFERRED EMBODIMENT

An embodiment of the invention is explained below with reference to the drawings.

Figure 1:
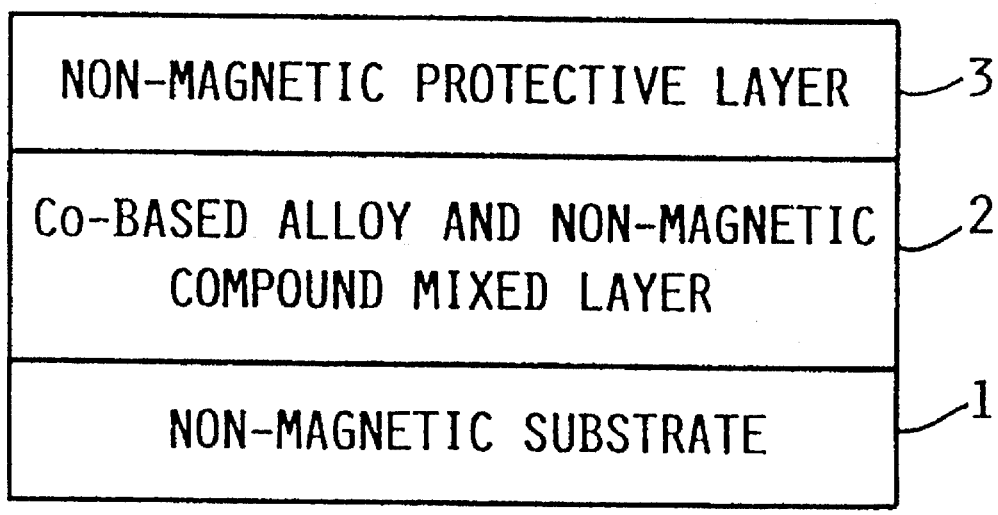
FIG. 1 is a cross-sectional view of a magnetic recording medium according to the invention.
Figure 2:
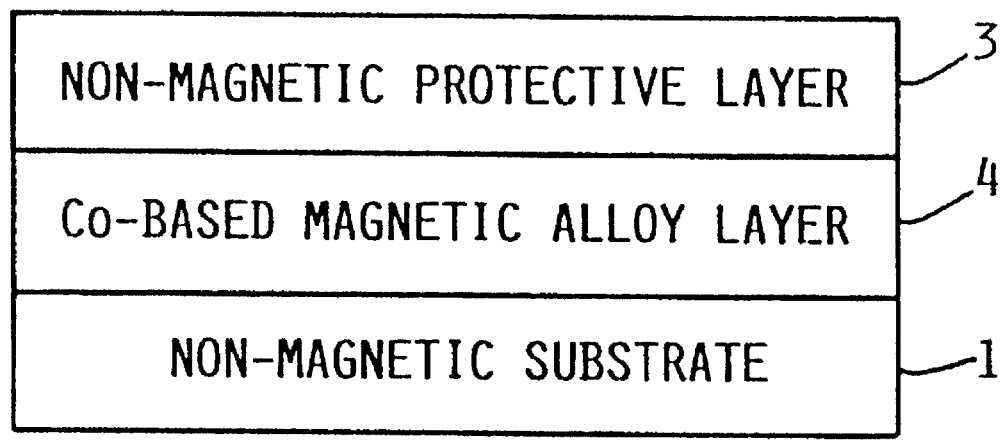
FIG. 2 is a cross-sectional view of a conventional magnetic recording medium without a non-magnetic underlayer, which was prepared for the purpose of comparison.

FIG. 1 shows the structure of a magnetic recording medium according to the invention. On a non-magnetic glass substrate 1, a magnetic layer 2 was formed. By using DC magnetron sputtering for Co75.5Cr12.5Pt11.5 (argon back pressure: 5 mTorr) and RF magnetron sputtering for compound SiO2, the magnetic material and the non-magnetic compound are deposited simultaneously. The mixed volume percentage of SiO2 is set at 5%. On the magnetic layer 2, a ZrO2 film (30 nm thick) was formed as a non-magnetic protective layer 3 by RF sputtering. Further, a medium using SiN instead of SiO2 and a medium using ZrO2 were prepared in the same conditions (composition of magnetic alloy, mixed-volume percentage, and so on) as for SiO2. In addition, for comparison purposes, a medium having a Co-based magnetic alloy layer 4 was prepared by forming a film consisting of Co70Cr14Pt16 on a non-magnetic glass substrate 1, the other conditions being identical with those in the foregoing cases (FIG. 2).

Figure 3:
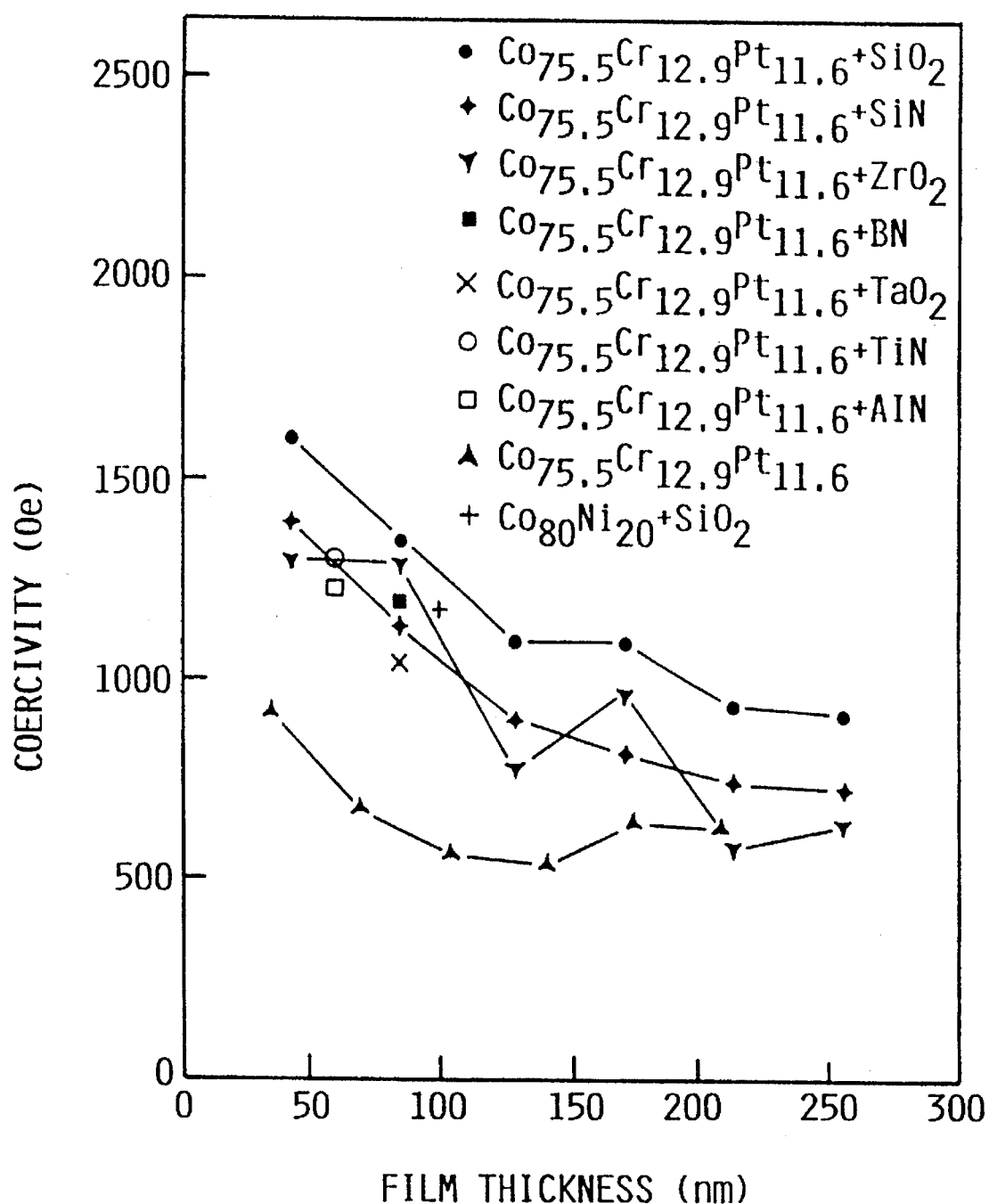
FIG. 3 is a graph showing the relations between the thickness and coercivity of a magnetic recording medium according to the invention and of a conventional magnetic recording medium.

FIG. 3 shows the results obtained when the coercivity was measured by varying the thickness of the magnetic layer 2 or 4. It can be understood from the figure that the magnetic characteristics are significantly improved throughout the entire thickness range by admixture of a non-magnetic compound. In particular, the improvement is remarkable in the thinner range. In FIG. 3, the values of coercivity measured for a medium using BN (instead of) SiO2, a medium using TaO2, a medium using TiN, and a medium using AlN are also shown, although with only one point for each medium. The conditions for preparing these media (composition of magnetic alloy, mixed volume percentage, and so on) were the same as for the medium using SiO2. In addition, a medium was prepared by using the binary alloy Co80Ni20 as a magnetic alloy and SiO2 as a non-magnetic compound. DC magnetron sputtering was performed for a film of the former and RF sputtering for the latter. The other conditions (mixed volume percentage, etc.) were the same as for SiO2. FIG. 3 also shows the result of measuring the coercivity for this medium, although with only one point.

Next, the magnitudes of the torque in the in-plane direction were measured for the sample whose magnetic layer is a mixed film of Co75.5Cr12.9Pt 11.6 and SiO2 (mixed volume percentage: 5 vol %) and the sample whose magnetic layer consists of Co75.5Cr12.9Pt11.6 alone. The thickness of the magnetic layer was 85 nm for both samples. The results of the measurement are shown in Table 1. It can be understood from the table that a mixture of SiO2 gives a greater in-plane anisotropy.

TABLE 1

| Sample | Torque($\times$ 105 dyne-cm) |
| --- | --- |
| Co75.5Cr12.9Pt11.6 + SiO2 | 9.75 |
| Co75.5Cr12.9Pr11.6 | 4.52 |

Figure 4:
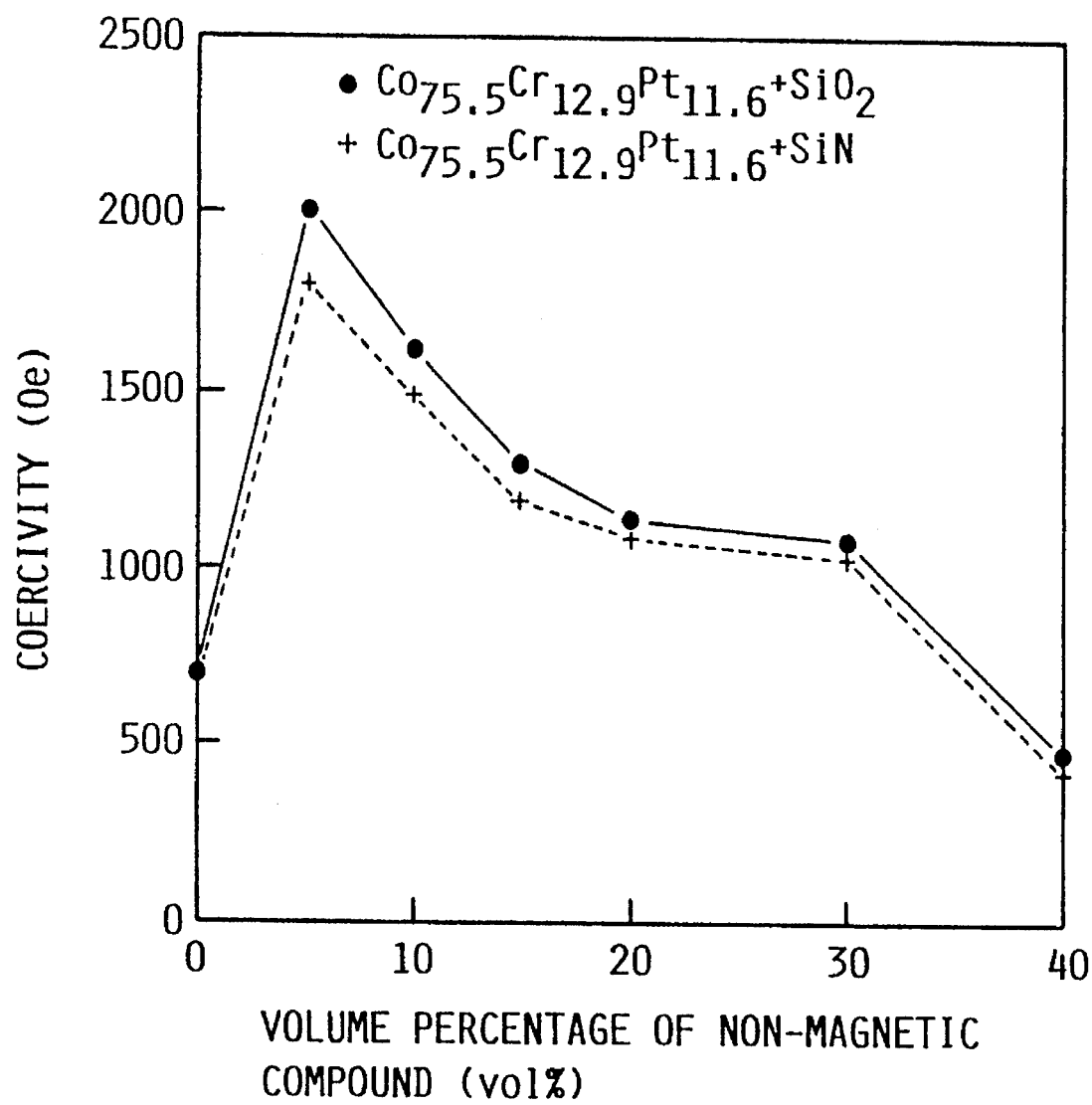
FIG. 4 is a graph showing the relations between the mixed volume percentage of the non-magnetic compound and the coercivity of the magnetic recording medium.

Next, in order to find the relation between the mixed volume percentage of the non-magnetic compound and the coercivity of the medium, an experiment was performed on media having the structure shown in FIG. 1, with the substrate 1 being a glass substrate, the magnetic layer 2 being 43 nm thick, and the protective layer 3 being a 30-nm-thick ZrO2 film. The result is shown in FIG. 4. In the figure, black circles indicate data obtained from a medium in which the non-magnetic compound in the magnetic layer 2 is SiO2, while black diamond shapes indicate data obtained from a medium whose non-magnetic compound is SiN. It can be understood from the figure that excellent characteristics are obtained when the mixed volume percentage of the non-magnetic compound is not less than about 2% and not more than about 30%. In particular, when the mixed volume percentage is about 5 vol %, a coercivity of as much as about 2000 (Oe) is obtained.

Figure 5:
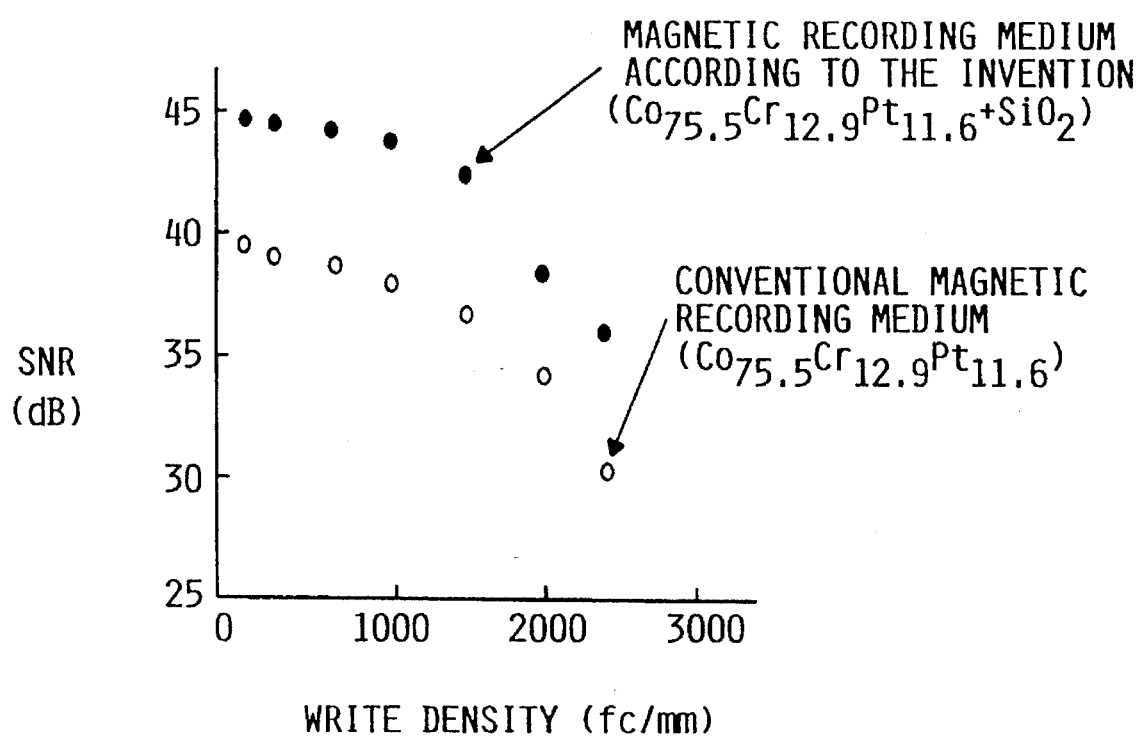
FIG. 5 is a graph showing the recording characteristics (signal-to-noise ratios) of a magnetic recording medium according to the invention and of a conventional magnetic recording medium.

Finally, an experiment was performed on each sample (disk) shown in Table 1 to find the relation between write density and medium noise. The rotational speed of the disk was 3600 rpm, the recording current was 100 mAp-p, and a thin film head was used as a recording head. The recording characteristic (signal-to-noise ratio) was measured by varying the number of flux changes per millimeter. It can be understood from FIG. 5 that the sample according to the invention shows an excellent S/N characteristic.

As explained above, the invention has excellent magnetic characteristics suitable for longitudinal recording without an underlayer. However, such an underlayer may be interposed between a substrate and a magnetic layer for the purpose of adjusting the magnetic characteristic obtained by mixing a magnetic alloy and a non-magnetic compound in the magnetic layer, and the scope of the invention extends to such media.

Note that the protective layer is not limited to the ZrO2 film described above, but may be a film of any single material such as amorphous carbon or SiO2 that is known to be suitable for protection of a magnetic film.

What is claimed is:

1. A method for fabricating a magnetic recording medium comprising the steps of:

(a) providing a substrate; and (b) forming a magnetic layer comprising a mixture of a magnetic alloy and a non-magnetic compound by depositing both simultaneously onto said substrate, said magnetic alloy being Co-based, Fe-based, or FeCo-based and said non-magnetic compound containing at least one compound selected from a group consisting of silicon oxide, zirconium oxide, tantalum oxide, silicon nitride, boron nitride, titanium nitride, and aluminum nitride, the deposition process being carried out by evaporation and/or sputtering so that the volume percentage of said non-magnetic compound in the entire volume of said mixture of a magnetic alloy and a non-magnetic compound is not less than about 2% and not more than about 30%.

2. The method for fabricating a magnetic recording medium according to claim 1 wherein said step of forming said magnetic layer includes the substeps of (b 1) DC magnetron sputtering a target to provide said magnetic alloy, and (b2) RF magnetron sputtering a target to provide said non-magnetic compound simultaneous to said substep of DC magnetron sputtering.

3. The method for fabricating a magnetic recording medium according to claim 1 wherein said magnetic alloy is a ternary alloy selected from a group consisting of CoNiCr, CoNiPt, CoPtCr, and CoCrTa.

4. The method for fabricating a magnetic recording medium according to claim 3 wherein the composition of said Co-based ternary magnetic alloy is expressed by $$Co(1-x-y)Ni(x)Cr(y)$$

where $0.2<=x<=0.4$ and $0.05<=y<=0.1$.

5. The method for fabricating a magnetic recording medium according to claim 3 wherein the composition of said Co-based ternary magnetic alloy is expressed by $$Co(1-x-y)Ni(x)Pt(y)$$

where $0.2<=x<=0.4$ and $0.01<=y<=0.2$.

6. The method for fabricating a magnetic recording medium according to claim 3 wherein the composition of said Co-based ternary magnetic alloy is expressed by $$Co(1-x-y)Cr(x)Pt(y)$$

where $0.1<=x<=0.3$ and $0.01<=y<=0.2$.

7. The method for fabricating a magnetic recording medium according to claim 3 wherein the composition of said Co-based ternary magnetic alloy is expressed by $$Co(1-x-y)Cr(x)Ta(y)$$

where $0.1<=x<=0.3$ and $0.01<=y<=0.05$.

8. The method for fabricating a magnetic recording medium according to claim 1, wherein said non-magnetic compound contains at least one compound selected from a group consisting of silicon nitride, boron nitride, titanium nitride, and aluminum nitride.

9. The method for fabricating a magnetic recording medium according to claim 1 wherein the volume percentage of said non-magnetic compound in the entire volume of said mixed magnetic alloy and non-magnetic compound is about 5%.

10. A method for fabricating a magnetic recording medium, said method comprising the steps of:

(a) providing a substrate; and (b) forming a magnetic layer comprising a mixture of a magnetic alloy and a non-magnetic compound by depositing both simultaneously onto said substrate so that the volume percentage of said non-magnetic compound in the entire volume of said mixture of a magnetic alloy and a non-magnetic compound is not less than about 2% and not more than about 30%, said step of forming said magnetic layer including the substeps of (b1) DC magnetron sputtering a target to provide said magnetic alloy, and (b2) RF magnetron sputtering a target to provide said non-magnetic compound simultaneous to said substep of DC magnetron sputtering.

11. The method for fabricating a magnetic recording medium according to claim 10 wherein the volume percentage of said non-magnetic compound in the entire volume of said mixed magnetic alloy and non-magnetic compound is about 5%.

* * * * *